(12) United States Patent
Yankov et al.

(10) Patent No.: US 8,596,846 B2
(45) Date of Patent: Dec. 3, 2013

(54) FRONTLIGHT UNIT FOR ENHANCING ILLUMINATION OF A REFLECTIVE DISPLAY

(75) Inventors: Vladimir Yankov, Washington Township, NJ (US); Alexander Goltsov, Troitsk (RU); Igor Ivonin, Ybileinyi (RU); Leonid Velikov, San Carlos, CA (US)

(73) Assignee: Nano-Optic Devices, LLC, Washington Township, NJ (US)

( * ) Notice: Subject to any disclaimer, the term of this patent is extended or adjusted under 35 U.S.C. 154(b) by 144 days.

(21) Appl. No.: 13/421,862

(22) Filed: Mar. 16, 2012

(65) Prior Publication Data

US 2013/0242596 A1    Sep. 19, 2013

(51) Int. Cl.
 *F21V 7/04* (2006.01)
(52) U.S. Cl.
 USPC ............ 362/553; 362/624; 362/606; 349/61; 349/63; 349/64; 349/5; 359/599; 359/292; 359/34
(58) Field of Classification Search
 USPC ........ 362/606, 607, 624, 625; 349/61, 63, 64, 349/65; 359/599, 290, 292, 34
 See application file for complete search history.

(56) References Cited

U.S. PATENT DOCUMENTS

| | | | |
|---|---|---|---|
| 6,650,382 B1 | 11/2003 | Sumida et al. | |
| 6,657,683 B2 | 12/2003 | Richard | |
| 6,999,665 B2 * | 2/2006 | Veligdan | 385/120 |
| 7,502,081 B2 | 3/2009 | Umemoto et al. | |
| 7,508,466 B2 | 3/2009 | Hutchins | |
| 7,603,001 B2 | 10/2009 | Wang et al. | |
| 7,733,439 B2 | 6/2010 | Sampsell et al. | |
| 7,777,954 B2 | 8/2010 | Gruhike et al. | |
| 7,813,026 B2 | 10/2010 | Sampsell | |
| 7,845,841 B2 | 12/2010 | Sampsell | |
| 7,855,827 B2 | 12/2010 | Xu et al. | |
| 7,859,610 B2 | 12/2010 | Mizushima et al. | |
| 7,859,731 B2 | 12/2010 | Choi | |
| 7,864,395 B2 | 1/2011 | Chui | |
| 7,944,524 B2 | 5/2011 | Akiyama et al. | |
| 7,949,213 B2 | 5/2011 | Mienko et al. | |
| 8,009,244 B2 | 8/2011 | Toriyama et al. | |
| 2007/0133226 A1 * | 6/2007 | Mi | 362/607 |
| 2008/0259247 A1 | 10/2008 | Stuart et al. | |
| 2009/0086466 A1 * | 4/2009 | Sugita et al. | 362/97.2 |
| 2009/0296194 A1 * | 12/2009 | Gally et al. | 359/291 |
| 2009/0303417 A1 * | 12/2009 | Mizushima et al. | 349/65 |
| 2011/0026270 A1 | 2/2011 | Onishi | |

* cited by examiner

*Primary Examiner* — Ali Alavi

(57) ABSTRACT

The frontlight illumination system is intended for enhancing illumination of a reflective display having pixels arranged in a matrix pattern and using monochromatic laser lights as light sources. The unit contains a network of light-distributing planar ridge waveguides with holograms arranged in a matrix pattern that corresponds to the matrix pattern of the reflective display. The light-distributing holograms of the system are formed on opposite sides of each core of respective light-distributing planar ridge waveguides. Neighboring holograms located on opposite sides of the core are combined into pairs and are arranged on each core in positions at which they interact with a predetermined phase shift that doubles the intensity of light directed to the reflective display and extinguishes light directed to the external surface.

19 Claims, 5 Drawing Sheets

FRONTLIGHT UNIT FOR ENHANCING ILLUMINATION OF A REFLECTIVE DISPLAY

FIELD OF THE INVENTION

The present invention relates to a frontlight unit for reflective displays and is aimed at improving brightness of illumination and efficiency of light-source energy consumption. The invention may find use in displays of mobile devices having poor illumination conditions such as laptop computers, cell phones, iPads or tablets, so-called electronic paper, electronic calculators, electronic labels, or the like.

BACKGROUND OF THE INVENTION

A frontlight unit is a means for illuminating a display assembly, such as a liquid crystal display (LCD), an interferometric modulation display (IMOD), or a display that is viewed in ambient light. A provision of the frontlight unit improves performance of the display in poor lighting conditions. Frontlights are inferior to backlights and are usually used as an auxiliary feature.

Generally, a display presents an image by absorbing some of the light passing through. When an electrical field is applied across the crystal, e.g., in an LCD, the electrical field changes the passing light so that light does not pass through a polarization filter. When the electrical field is absent, the polarization filter passes predetermined wavelength components of white light. The remaining portion of white light is absorbed. For example, in an RGB image obtained from white light, approximately two-thirds of the light energy is lost and does not participate in the image-formation process. The aforementioned absorbed light is produced by a power source, e.g., a battery-operated device. If it were possible to obviate the losses of light energy associated with the absorption of the light components that do not participate in the image-formation process, it would be possible to significantly improve power-source efficiency, i.e., to prolong the service life of the light source, such as a battery.

A nonilluminated display may be lit from the front. To use ambient light in an LCD, the liquid crystal, itself, is sandwiched between a polarization filter and a reflective surface, i.e., a mirror. The mirror causes the display to be opaque so that the display cannot be illuminated from the back. In order to improve the brightness and contrast of the image reproduced by a reflective display, it is desirable to enhance illumination with an additional artificial source of frontlight.

Frontlight systems for reflective displays are relatively new devices, and the concept of frontlight display is also relatively new. Nevertheless, many patents and patent applications are already dedicated to the structure and use of frontlight devices (see, e.g., U.S. Pat. No. 6,650,382 issued on Nov. 18, 2003 [inventors: Sumida, et al]; U. S. Pat. No. 6,657,683 issued on Dec. 2, 2003 [Inventor: Richard]; U.S. Pat. No. 7,603,001 issued on Oct. 13, 2009 to Wang, et al; U.S. Pat. No. 7,502,081 issued on Mar. 10, 2009 to Umemoto, et al; U.S. Pat. No. 7,733,439 issued on Jun. 8, 2010 to Sampsell, et al; U.S. Pat. No. 7,777,954 issued on Aug. 17, 2010 to Gruhlke, et al; U.S. Pat. No. 7,855,827 issued on Dec. 21, 2010 to Xu, et al; U.S. Pat. No. 7,813,026 issued on Oct. 12, 2010 to Sampsell; U.S. Pat. No. 7,864,395 issued on Jan. 4, 2011 to Chui; U.S. Pat. No. 8,009,244 issued on Aug. 30, 2011 to Toriyama, et al; U.S. Pat. No. 7,944,524 issued on May 17, 2011 to Akiyama, et al; and U.S. Pat. No. 7,949,213 issued on May 24, 2011 to Mienko, et al).

Various methods for delivery of frontlight are known in the art. Most often, a light source is placed around the perimeter of an LCD. Other systems use backlight, which is redirected to the display edges and which then propagates through the space between the display, itself, and the front protective layer. There exists a great variety of improvements to both of these concepts, such as preventing exit of propagated light from the aforementioned space, or similar methods aimed at providing full reflection of light in said space. Other methods and means are aimed at improving efficiency of frontlight-separation, e.g., improving input of light from display edges, etc.

Common drawbacks of existing frontlight display illumination systems are inefficient use of light source, insufficient brightness and contrast, and complexity of structure.

Implementation of the holographic technique for frontlight display illumination is also known in the art. U.S. Pat. No. 7,845,841 issued on Dec. 7, 2010 to J. Sampsell discloses a frontlight display illuminator that uses holograms embedded in a waveguide plate of a special configuration.

U.S. Pat. No. 7,859,731 issued on Dec. 28, 2010 to Jin-Seung Choi discloses an illumination apparatus and method for a display device designed such that light is incident on a hologram or hologram pattern at an angle for which diffraction efficiency is the highest. The illumination apparatus includes at least one point of light source that emits light and a light guide plate (LGP) that has at least one point of light source disposed on a side thereof and a hologram pattern on the top surface that permits the light incident from the point of light source to exit from the top surface. The side of the LGP facing the point of light source is inclined such that the light is incident obliquely on the hologram pattern at an altitude angle that provides high diffraction efficiency.

The use of lasers for backlighting is known. For example, U.S. Pat. No. 7,508,466 issued on May 24, 2009 to Hutchins discloses an LCD display that includes a planar array of transmissive LCD devices and at least one laser diode device spaced apart from the planar array of LCD devices. At least one laser diode device is configured to illuminate at least a subset of LCD devices of the planar array of LCD devices so that in operation the laser diode device provides backlighting for the subset of LCD devices.

US Patent Application Publication No. 20110026270 published on Feb. 3, 2011 (inventor: Onishi) discloses a surface light-source device from which a large planar light with uniform light intensity distribution can be obtained from a spot-like laser light. The surface light-source device comprises a laser light source for emitting laser light, an optical system including one or more reflective diffusion members, and an optical waveguide combined with the optical system for converting reflected and diffused laser light into the planar light and emitting it from a principal plane. The reflective diffusion member converts the laser light emitted from the laser light source into a linear light having an arcuate radiation pattern.

US Patent Application Publication No. 20080259247 (published on Oct. 23, 2008, inventor: C. Stuart, et al) discloses a display, such as an LCD panel, that is illuminated using frequency-doubled vertical extended-cavity surface-emitting lasers (VECSELs) as efficient light sources. Visible light from VECSELs is directed to an illuminating panel using optical fibers and/or optical gratings to provide substantially uniform illumination of the illuminating panel. Visible light from the illuminating panel, which can be provided at a particular number of primary wavelengths by the VECSELs, is then used to illuminate the display.

A laser light source supplied by special optics for use in planar lighting devices as a backlight device is also known in the art. U.S. Pat. No. 7,859,610 granted on Dec. 28, 2010 to T. Mizushima describes a laser system that can be used for RGB laser light illumination in display assemblies.

Further development of front illumination systems with improved efficiency of lighting is disclosed in U.S. patent application Ser. No. 13/373,434 filed by the same applicants as the applicants of the present application on Nov. 14, 2011. The system comprises a frontlight unit that is intended to enhance illumination of a reflective display having pixels arranged in a matrix pattern and using monochromatic laser lights as light sources. The unit contains a network of light-distribution planar ridge waveguides with holograms arranged in a matrix pattern that corresponds to the matrix pattern of the reflective display when the frontlight unit is interposed onto the reflective display. The unit emits light in the downward direction in the form of diverging beams that fall onto the pixels of the reflective display and in the upward direction onto mirrors from which light is reflected also in the form of diverging beams onto the reflective display. However, the reflective mirrors occupy up to 10% of the surface area of the display, thus blocking a portion of image-carrying light.

SUMMARY

The present invention relates to frontlight units for reflective displays having pixels arranged in a matrix pattern and is aimed at improving image quality, i.e., image brightness and contrast. Such displays are used, e.g., in electronic calculators, electronic labels, so-called electronic paper, or the like, and are also aimed at improving efficiency of light-source energy consumption.

The frontlight illumination system of the invention for a reflective display has a layered structure that comprises a rectangular transparent substrate, the surface of which is covered with a net of planar ridge waveguides. This net is used to deliver specific monochromatic laser lights, e.g., red, green, and blue, to specific points on the substrate.

Structurally, each planar ridge waveguide comprises a core embedded into the cladding layer or placed onto the top surface of the cladding. The core and cladding are made from transparent optical materials that have different coefficients of refraction. Both can be made from the same materials if the materials have different coefficients of refraction. For example, the materials can be a pair of silicon oxide $SiO_2$, a pair of silicon nitride $Si_3N_4$, or their combinations, etc. If necessary, the upper cladding may be coated with a transparent protective film.

The system also contains laser light sources, e.g., red, green, and blue, which deliver light to the aforementioned net through a light-separating planar ridge waveguide located at least on one side of the rectangular substrate. Furthermore, the system contains a plurality of light-distributing planar ridge waveguides. These light-distributing planar ridge waveguides are combined into a set of waveguides that are arranged in parallel to each other and are intended to guide lights of different colors. A plurality of such sets extends across the substrate perpendicular to the light-separating planar ridge waveguide to which the plurality of sets is optically coupled. For RGB lights, each set may comprise a triplet that consists of parallel planar ridge waveguides for propagating red, green, and blue lights.

The core surface of each light-separating planar ridge waveguide contains a pattern of first individual light beam-redirection means in the form of light-separating digital planar holograms that redirect the light of different wavelengths obtained from specific lasers into the corresponding light-distributing planar ridge waveguides. The latter, in turn, have on the surfaces of their cores a set of first illuminating digital planar holograms that redirect a part of the light outward in both directions from the plane of the transparent substrate. It is understood that the upward component of light is a parasitic component because it enters the eyes of the viewer without interacting with the image-forming matrix, e.g., the LCD matrix. In other words, this light does not carry image information and must be eliminated. In order to achieve this objective, the system is provided with a set of second illuminating digital holograms that double the intensity of light emitted in the downward direction, i.e., toward the LCD matrix, and extinguish the aforementioned parasitic light components. In other words, the front illumination unit of the invention is provided with binary illuminating holograms, i.e., holograms of the first type and holograms of the second type, as mentioned above.

According to the invention, elimination of parasitic light is achieved by placing the first illuminating digital planar hologram on one side of the core that is embedded in the cladding (or placed onto the cladding surface) and placing the second illuminating digital planar hologram on the other side of the core. The holograms of both types are identical but their interpositions are selected so that light beams directed from the holograms of the same core in the downward direction are doubled while light beams directed from the holograms of the same core in the upward direction are extinguished. More specifically, holograms of both types are arranged so that with the selection of a predetermined core thickness, light emitted from neighboring holograms of the first type and of the second type interfere with each other at a predetermined phase shift that doubles the downward light components and extinguishes the upward light components.

Thus, the same objective as that claimed in U.S. patent application Ser. No. 13/373,434 is achieved but without the use of second light-redirecting means, i.e., reflective mirrors. As a result, the structure is simplified, thus reducing manufacturing cost of the frontlight unit for reflective displays as a whole.

The system of the invention is suitable for reflective displays of many types, including IMOD matrix reflective displays, electrophoretic reflective displays, LCD displays, or the like, including monochromatic displays.

According to another aspect of the invention, the reflective-display frontlight illumination system of the above-described type may have holograms that are further provided with light-focusing features so that light beam focus points can be located above and below the holograms in the upper and lower parts of the cladding, respectively, i.e., above or below the core. Actual positions of such focus points are determined by hologram pattern topology. This makes it possible to form converging and/or diverging light beams, and this property, in turn, can contribute to uniformity of illumination.

DETAILED DESCRIPTION OF INVENTION

The present invention relates to a frontlight illumination system for reflective displays having pixels arranged in a matrix pattern and is aimed at improving image quality, i.e., brightness and contrast of images reproduced for displays used in ambient light. Displays of this type are employed, e.g., in electronic calculators, electronic labels, so-called electronic paper, etc., and are also aimed at decreasing energy consumption of the light source.

Figure 1:
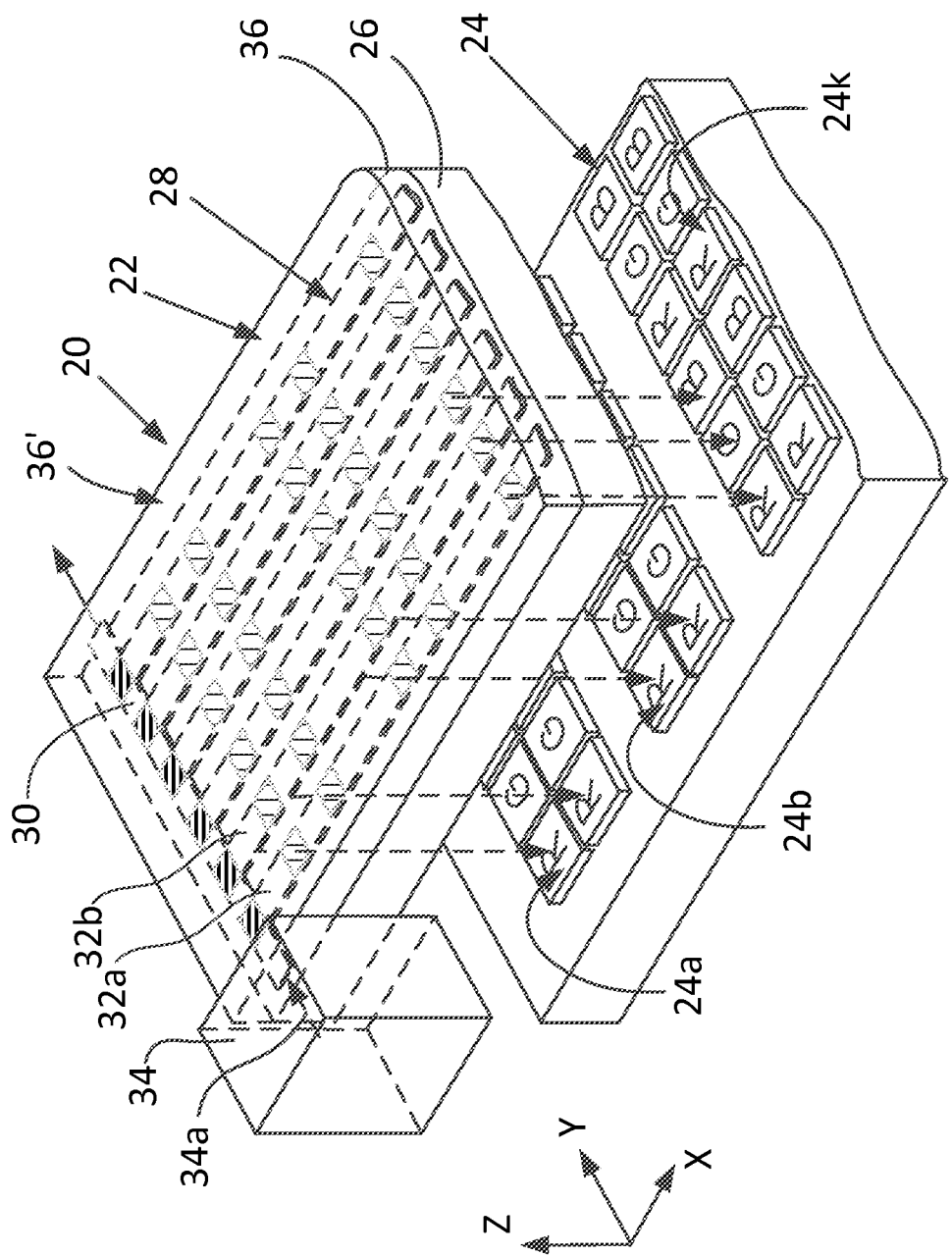
FIG. 1 is a simplified three-dimensional exploded view of the frontlight illumination system for a reflective display in accordance with one aspect of the invention.
Figure 2:
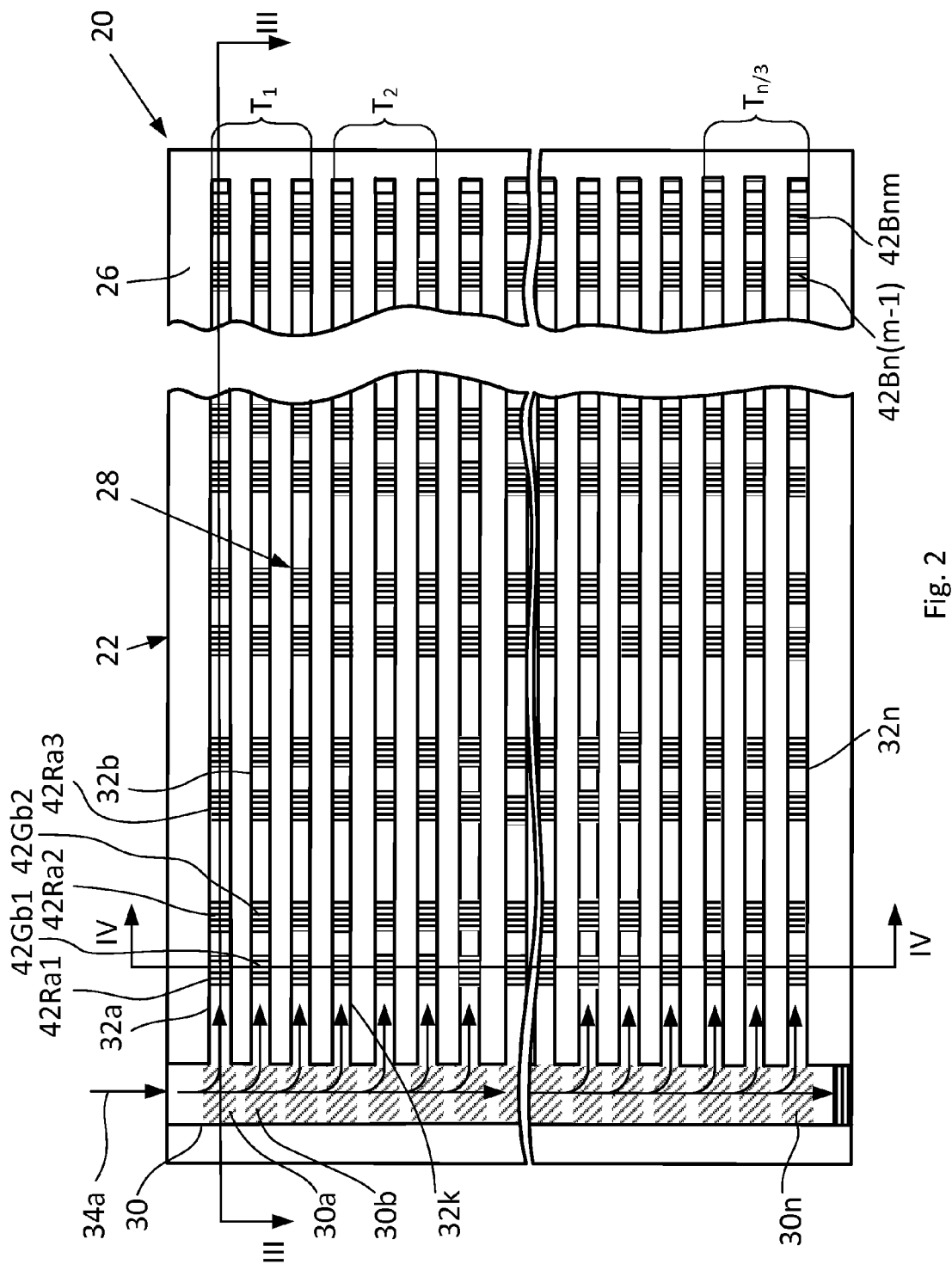
FIG. 2 is a top view of a planar ridge waveguide net with binary holograms used in the frontlight illumination system of the invention.
Figure 3:
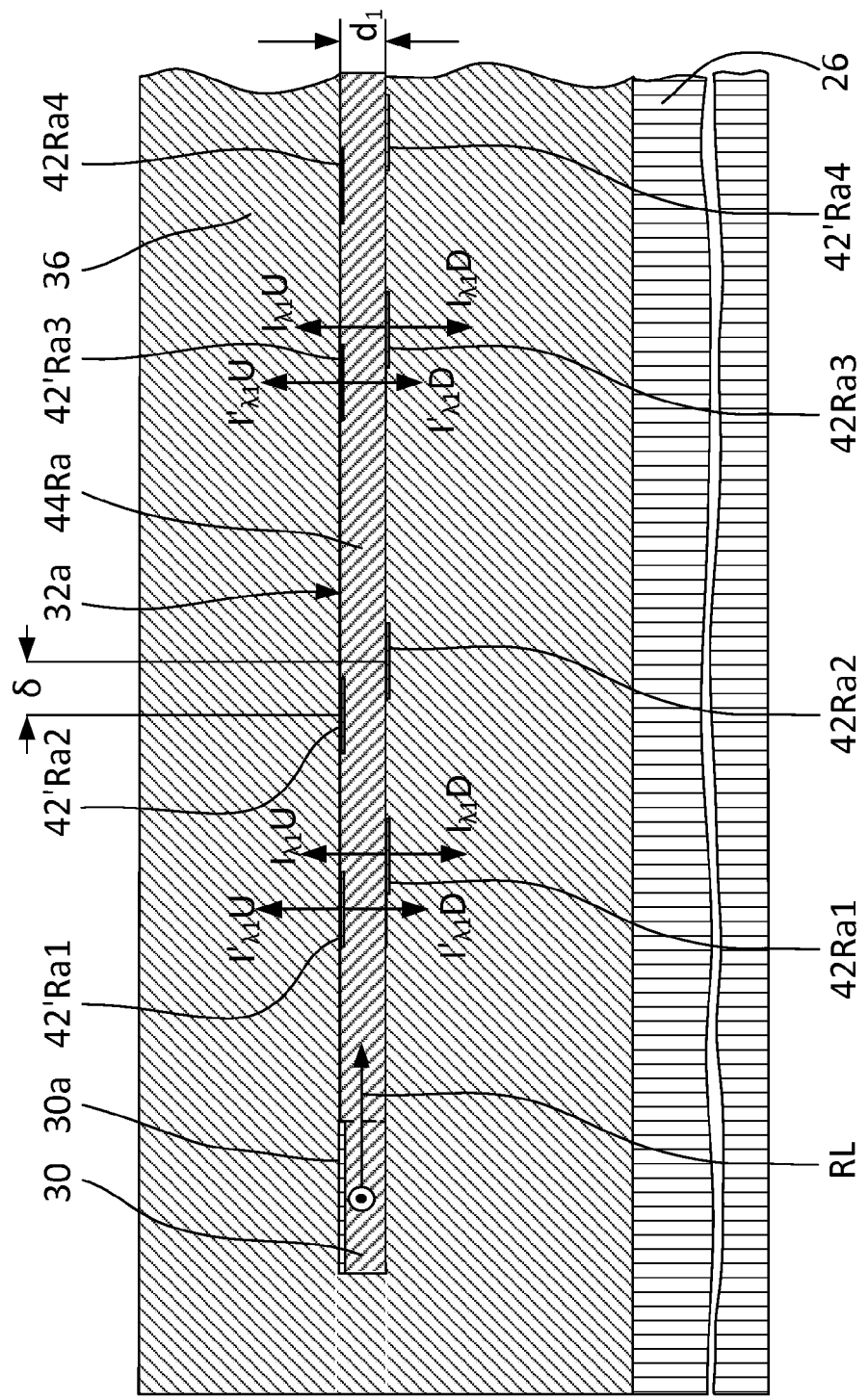
FIG. 3 is a sectional view along the line III-III in FIG. 2.
Figure 4:
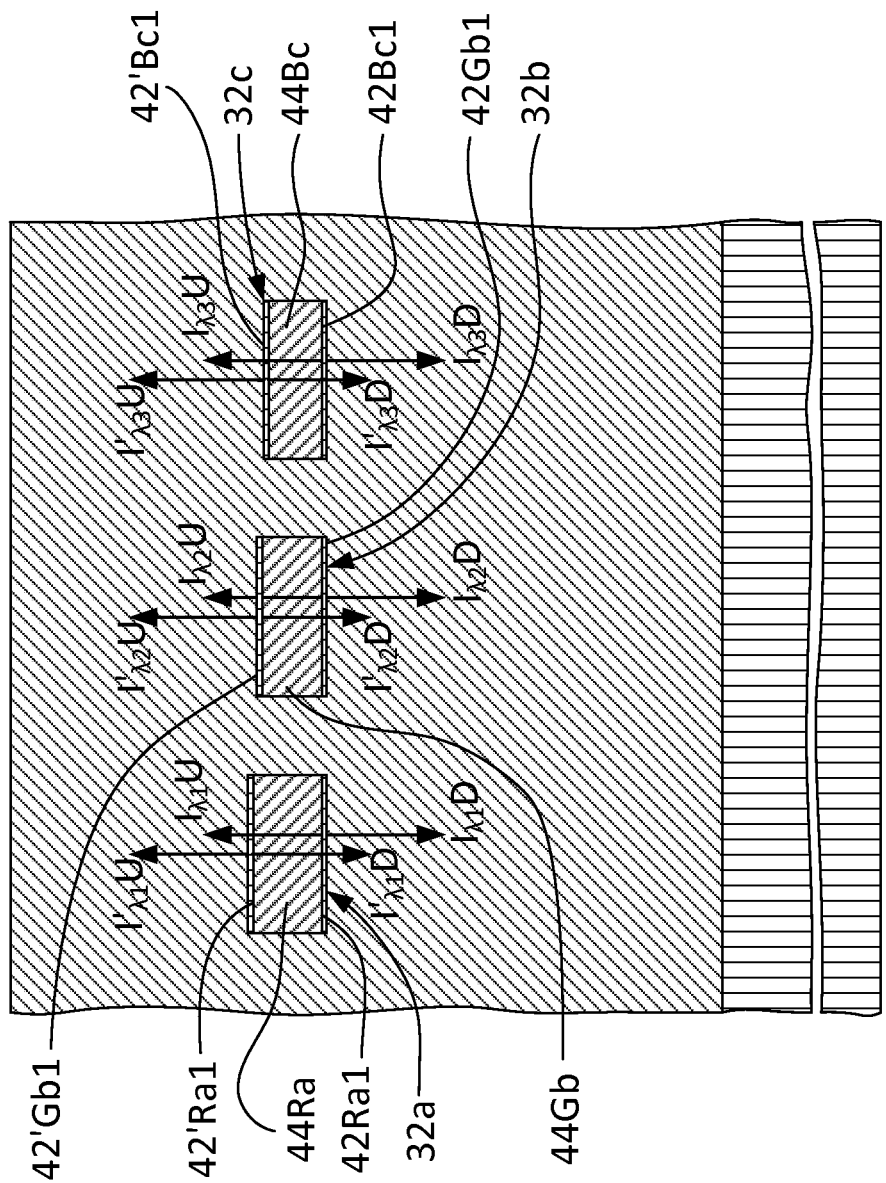
FIG. 4 is a sectional view along the line IV-IV in FIG. 2.

The invention will now be described in detail with reference to the accompanying drawings, where FIG. 1 is a simplified three-dimensional exploded view of the frontlight illumination system for a reflective display in accordance with one aspect of the invention, FIG. 2 is a top view of a planar ridge waveguide net with binary holograms used in the frontlight illumination system of the invention, FIG. 3 is a sectional view along the line III-III in FIG. 2, and FIG. 4 is a sectional view along the line IV-IV in FIG. 2.

As shown in FIG. 1, a frontlight reflective display system of the invention (hereinafter referred to as the "system"), which as a whole is designated by reference numeral 20, has a layered structure that comprises a frontlight illumination unit 22 which is shown in cooperation, e.g., with a matrix 24 of LCD elements 24a, 24b . . . 24k . . . . In fact, the matrix 24 of LCD elements comprises an image-generation unit. Moreover, this image-generation unit is not necessarily an LCD and may comprise, e.g., a Qualcomm Mirasol™ display, or the like.

It should be noted that the matrix of the LCD elements is beyond the scope of the present invention and is shown only as an example. The frontlight illumination unit 22 of the invention may operate in conjunction with other image-generation units, such as electrophoretic reflective displays, etc.

The frontlight illumination unit 22 has a rectangular transparent substrate 26, the surface of which is covered with a net 28 of planar ridge waveguides (FIG. 2). The net 28 is used for delivering specific monochromatic laser lights, e.g., red, green, and blue, to specific points on the substrate 26. The laser lights are shown by arrow 34a in FIGS. 1 and 2.

The net consists of one light-separating planar ridge waveguide 30 which extends along one side of the rectangular transparent substrate 26 and a plurality of light-distributing planar ridge waveguides 32a, 32b . . . 32n (FIG. 2) which are optically coupled to predetermined places of the net, more specifically, of light-separating planar ridge waveguide 30, which is described in earlier U.S. patent application Ser. No. 13/373,434 of the same applicants. The light-separating planar ridge waveguide 30 and the distribution planar ridge waveguides 32a, 32b . . . 32n have a common structure in their cross-sections, which are shown in FIG. 3 and FIG. 4, where FIG. 3 is a sectional view along the line III-III in FIG. 2, and FIG. 4 is a sectional view along the line IV-IV in FIG. 2. (For simplicity in the drawings, only portions of cross-sections along lines III-III and IV-IV are shown in FIGS. 3 and 4, respectively). The light-separating planar ridge waveguide 30 and the distribution planar ridge waveguides 32a, 32b . . . 32n may vary in width. The core of the light-separating planar ridge waveguide 30 and the cores of all light-distributing planar ridge waveguides 32a, 32b . . . 32n that form the net 28 are embedded into a common cladding layer 36 (FIGS. 1, 2, and 3). If necessary, the external surface 36' of the cladding 36 that is located on the side of the transparent waveguide medium opposite the reflective display 24 may be coated with a transparent protective film (not shown).

The light-distributing planar ridge waveguides 32a, 32b . . . 32n are combined into parallel sets of waveguides to guide lights of different colors. A plurality of such parallel sets extends across the substrate perpendicular to the light-separating planar ridge waveguide 30 to which the parallel sets are optically coupled, as mentioned above. With regard to RGB lights, each set may comprise a triplet that consists of parallel light-distributing planar ridge waveguides in order to propagate red, green, and blue lights. In FIG. 2, such triplets are designated by symbols $T_1, T_2 \ldots T_{(n/3)}$.

In these triplets, the illuminating digital planar holograms comprise holograms of at least three types, wherein a hologram of each type interacts with the light of a wavelength different from the wavelengths specified for the holograms of other types.

As shown in FIGS. 3 and 4, the light-separating waveguide 30 and the light-distributing waveguides 32a, 32b . . . 32n are embedded into the common cladding layer 36 that is supported by the transparent substrate 26. Each light-distributing waveguide comprises a strip-like core 44Ra, 44Gb, 44Bc . . . . The core surface of each light-separating planar ridge waveguide contains a pattern of first individual light beam-redirection means in the form of light-separating digital planar holograms 30a, 30b . . . 30n that redirect the light of different wavelengths obtained from specific lasers into corresponding light-distributing planar ridge waveguides 32a, 32b . . . 32n (FIG. 2). The latter, in turn, have on the surfaces of their cores 44Ra, 44Gb, 44Bc . . . 44Bn a set of first illuminating digital planar holograms 42Ra1, 42Ra2, 42Gb1 . . . 42Bn(m−1), and 42Bnm that redirect a portion of the light outward and in both directions from the plane of the transparent substrate, as shown in FIGS. 3 and 4 by arrows $I_{\lambda_1}D, I_{\lambda_1}U, I_{\lambda_2}D, I_{\lambda_2}U, I_{\lambda_3}D, I_{\lambda_3}U$ . . . . It is understood that the upward components $I_{\lambda_1}U, I_{\lambda_1}U, I_{\lambda_3}U$ . . . of the light are parasitic components because they enter the eyes of the viewer (not shown) without interacting with the image-forming matrix, e.g., the LCD matrix 24 shown in FIG. 1. This light does not carry image information and must be eliminated. In order to achieve this objective, the system is provided with a set of second illuminating digital holograms 42'Ra1, 42'Ra2, 42'Gb1 . . . 42'Bn(m−1), and 42'Bnm, the function of which is to double the intensity of light $I_{\lambda_1}D, I_{\lambda_2}D, I_{\lambda_3}D$ . . . emitted in the downward direction, i.e., toward the LCD matrix 24, and to extinguish the aforementioned parasitic light components $I_{\lambda_1}U, I_{\lambda_2}U, I_{\lambda_3}U$ . . . . In other words, the front illumination unit 22 of the invention is provided with binary holograms, i.e., holograms 42Ra1, 42Ra2, 42Gb1 . . . 42Bn(m−1), and 42Bnm of the first type and holograms 42'Ra1, 42'Ra2, 42'Gb1 . . . 42'Bn(m−1), and 42'Bnm of the second type, as described above.

As mentioned above, the first illuminating digital planar holograms 42Ra1, 42Ra2, 42Gb1 . . . 42Bn(m−1), and 42Bnm are located on one side of the core that is embedded in the cladding, and the second illuminating digital planar holograms 42'Ra1, 42'Ra2, 42'Gb1 . . . 42'Bn(m−1), and 42'Bnm are located on the other side of the core. Holograms of both types are identical, but their positions in each monochromatic light-distributing waveguide are different and are selected so that light beams $I_{\lambda_1}D, I_{\lambda_2}D, I_{\lambda_3}D$ . . . directed from holograms of the same core in the downward direction are doubled while light beams $I_{\lambda_1}U, I_{\lambda_1}U, I_{\lambda_3}U$ . . . directed from the holograms of the same core in the upward direction are extinguished.

More specifically, the holograms 42Ra1, 42Ra2, 42Gb1 . . . 42Bn(m−1), 42Bnm and 42'Ra1, 42'Ra2, 42'Gb1 . . . 42'Bn(m−1), 42'Bnm of both types are arranged so that with selection of a predetermined thickness of the cores 44Ra, 44Gb, 44Gb . . . , lights emitted from neighboring illuminating holograms, e.g., 42Ra1 and 42'Ra1 of the first type and lights emitted from the illuminating holograms of the second type interfere with each other at a predetermined phase shift δ that doubles the downward-light components and extinguishes the upward-light components.

In other words, the system comprises first individual light beam-redirection means, in the form of holograms such as holograms 42Ra1, 42Ra2, 42Gb1 . . . 42Bn(m−1), and 42Bnm formed on one of the core surfaces located in the aforementioned predetermined places of the net for redirecting individual light beams that propagate through light-distributing means in the first direction relative to the planar ridge waveguide medium and in the second direction relative to the planar ridge waveguide medium; and second light beam-redirection means in the form of holograms 42'Ra1, 42'Ra2, 42'Gb1 . . . 42'Bn (m−1), and 42'Bnm on other core surfaces for redirecting individual light beams that propagate through light-distributing means in the first direction relative to the planar ridge waveguide medium and in the second direction relative to the planar ridge waveguide medium.

Let us consider conditions of constructive interference for light beams $I_{\lambda_1}D$ and $I'_{\lambda_1}D$ which are emitted from a pair of neighboring, illuminating digital planar holograms 42Ra1 and 42'Ra1 formed on the core 44Ra of the waveguide 32a and which propagate downward (D designates downward in the drawing) and perpendicular to the frontlight illumination unit 22.

For each wavelength, the above condition of constructive interference of light is expressed as follows (FIG. 4):

$$(d-\delta)/\lambda = n_i \qquad (1)$$

where d is thickness of the waveguide core through which light propagates with wavelength λ, where δ is distance between centers of the neighboring first and second illuminating digital planar holograms of the pair, and where $n_i$ is an integer.

More specifically, for wavelength $\lambda_1$, the above condition is shown in FIG. 4 in the XZ plane (FIG. 1) and is written in the following form:

$$(d_1-\delta_1)/\lambda_1 = n_1 \qquad (2)$$

where $d_1$ is thickness of the waveguide core through which light propagates with wavelength $\lambda_1$, which is the wavelength of light in the material of the core with refractive index "n" ($\lambda_1 n = \lambda'_1$, where $\lambda'_1$ is the wavelength of light in a free space); $\delta_1$ is distance between centers of the first illuminating digital planar hologram 42Ra1 and the neighboring second illuminating digital planar hologram 42'Ra1.

Similar relations exist for wavelengths $\lambda_2$ and $\lambda_3$:

$$(d_2-\delta_2)/\lambda_2 = n_2 \qquad (3)$$

and $$(d_3-\delta_3)/\lambda_3 = n_3 \qquad (4)$$

The condition of destructive interference with regard to beams $I_{\lambda_1}U$ and $I'_{\lambda_1}U$ emitted from the holograms 42Ra1 and 42'Ra1 formed on the core 44Ra of the waveguide 32a and propagating upward (U designates upward in the drawing) and perpendicular to the frontlight illumination unit 22 (FIG. 4) is expressed as follows:

$$(d+\delta)/\lambda = n_i + \frac{1}{2} \qquad (5)$$

where d is thickness of the core, λ is a wavelength, δ is distance between centers of the first illuminating digital planar hologram 42Ra1 and the neighboring second illuminating digital planar hologram 42'Ra1, and $n_i$ is an integer. The beams $I_{\lambda_1}U$ and $I'_{\lambda_1}U$ emitted from the binary hologram that consists of the holograms 42Ra1 and 42'Ra1 formed on the core 44Ra of the waveguide 32a propagate upward (in the drawing, U designates upward) and perpendicular to the frontlight illumination unit 22.

The condition of destructive interference is written for parasitic lights that are directed to the external surface.

In this case, the following can be written for wavelength $\lambda_1$:

$$(d_1+\delta_1)/\lambda_1 = n'_1 + \frac{1}{2} \qquad (6)$$

where $d_1$ is thickness of the waveguide core through which light propagates with wavelength $\lambda_1$, which is the wavelength of light in the material of the core with a refractive index "n" ($\lambda_1 n = \lambda'_1$, where $\lambda'_1$ is the wavelength of light in a free space); $\delta_1$ is distance between the nearest edges of the binary hologram 42Ra1 and 42'Ra1, as shown in FIG. 4 in the XZ plane (FIG. 1), where $n_1$ is an integer.

Similar relationships exist between wavelengths $\lambda'_1$ and $\lambda'_2$:

$$(d_2+\delta_2)/\lambda_2 = n'_2 + \frac{1}{2} \qquad (7)$$

and $$(d_3+\delta_3)/\lambda_3 = n'_3 + \frac{1}{2} \qquad (8)$$

To determine real parameters of the frontlight illumination unit 22, it is necessary to consider the aforementioned relations in pairs for constructive and destructive interference and for each wavelength $\lambda'_1, \lambda'_2, \lambda'_3$, i.e., to consider equations (2) and (6), (3) and (7), and (4) and (8) simultaneously.

The wavelength 32a delivers red light with the wavelength $\lambda'_1$ to the pair of holograms 42Ra1 and 42'Ra. $\lambda'_1$ is equal to 638 nm. Similarly, for holograms that emit green light and blue light, $\lambda'_2$ is 532 nm and $\lambda'_3$ is 445 nm, respectively.

For the [waveguide SiO₂-cladding SiO₂] structure, the refractive index is assumed equal to n=1.5. Parameters of the frontlight illumination unit 22 are exemplified in Table 1. It is understood that a combination of parameters other than those shown in Table 1 is possible. For example, a set of parameters that provides constructive and destructive interference for lights of wavelengths $\lambda'_1, \lambda'_2, \lambda'_3$ directed downward and upward from each pair of binary holograms 42Ra1-42'Ra1, 42Ra24-2'Ra2, 42Gb1-42'Gb1 . . . 42Bn(m−1)-42'Bn(m−1), and 42Bnm-42'Bnm can also be obtained for values of $n_1=n_2=n_3=1$.

TABLE 1

| λ, nm | 638 | 532 | 445 |
|---|---|---|---|
| λ', nm | 440 | 367 | 307 |
| d, nm | 550 | 460 | 384 |
| δ, nm | 110 | 92 | 77 |
| $n_i$ | 1 | 1 | 1 |

Thus, it becomes possible to achieve the same objective as that in U.S. patent application Ser. No. 13/373,434 but without the use of second light-redirecting means, i.e., reflective mirrors.

In accordance with the aspect of the invention described above, cores of the light-distribution planar ridge waveguides 32a, 32b . . . 32n vary in thickness. To some extent this complicates manufacturing of the system.

In accordance with another aspect of the invention, it becomes possible to simplify the structure and thus to reduce manufacturing cost of the system as a whole.

Let us consider the following equation pairs: (1) and (4); (2) and (5); and (3) and (6). Also, let us find parameters $\delta_1, \delta_2$, and $\delta_3$ at which equations of the above pairs can satisfy equality of the left and right parts at approximately the same value of parameter "d". In this case, $n_1$, $n_2$, and $n_3$ may comprise an arbitrary integer that is specific for each pair.

Figure 5:
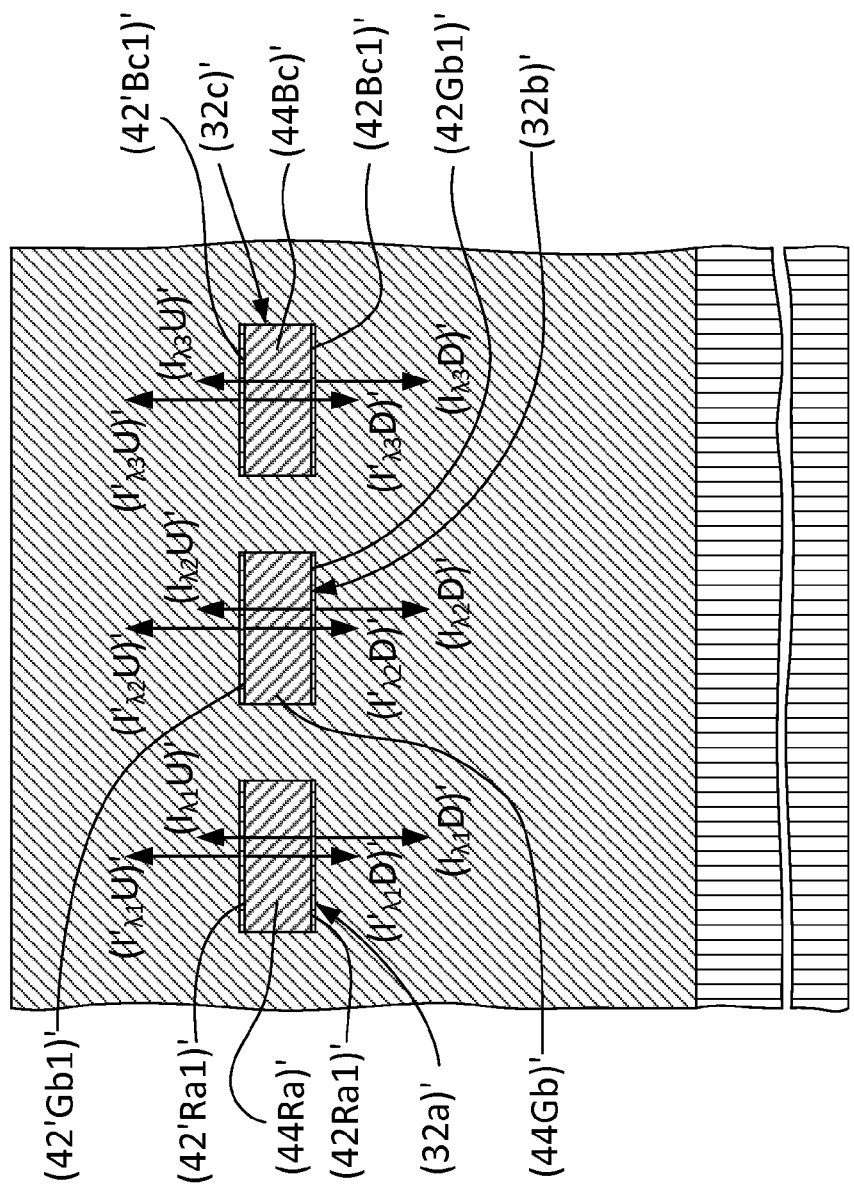
FIG. 5 is a sectional view along the line IV-IV in FIG. 2 in accordance with another aspect of the invention.

Shown in FIG. 5 is a modification of the system in which the cores have approximately the same thickness in the waveguides 32a', 32b' . . . 32n' of the entire net 28'. Those components in FIG. 5 that are similar to the components in FIG. 4 are designated by the same reference numerals in parentheses and with an addition of a prime. Thus, in FIG. 5 the cores 44Ra, 44Gb, and 44Bc in FIG. 4 are designated by reference numerals (44Ra)', (44Gb)', and (44Bc)', respectively. Accomplishment of the above condition significantly simplifies manufacturing of the lightguide plate of the invention and eliminates some steps in manufacturing processes such as lithography, etching, low-pressure chemical vapor deposition (LPCVD), etc.

The term "approximately" used in the previous paragraph means that the light propagating downward, i.e., toward the image-generating unit 24, and the light propagating upward toward the viewer do not fully interfere constructively or destructively but interfere partially with a degree of 75 to 90%, or higher. Although this condition creates some undesired light that does not carry image information, this insignificant drawback is to a great extent compensated by a multifold increase in image brightness provided by the downward component of light when the latter interacts with the image-generating unit 24. This is confirmed by the example given below.

Let us select a value of "d" equal to 550 nm in all six equations (2) and (6); (3) and (7); and (4) and (8). For $\lambda'_1=638$ nm, $\delta_1=110$ nm, and $n_1=1$, the equation pair (1) and (4) can be realized with accuracy of approximately 100%. Similarly, for $\lambda'_2=532$ nm, $\delta_2=100$ nm, and $n_2=1$, the equation pair (2) and (5) can be realized with accuracy of 85% or higher. For $\lambda'_3=440$ nm, $\delta_3=50$ nm, and $n_3=2$, the equation pair (4) and (8) can be realized with accuracy of approximately 82%. In other words, the approximation described above is justifiable.

Also, the condition of equality of thickness "d" in all cores is achieved by selecting appropriate values of $\delta$ and n in the equation mentioned above.

Although the invention is shown and described with reference to specific embodiments, it is understood that these embodiments should not be construed as limiting the areas of application of the invention and that any changes and modifications are possible provided that these changes and modifications do not depart from the scope of the attached patent claims. Thus, numerical values of parameters are given only as examples, and other values can be selected to optimize design of the lightguide plate. It is understood that the sets of parallel light-distributing planar ridge waveguides may contain more than three waveguides and may comprise, e.g., six waveguides composed of three pairs of waveguides operating with light of the same wavelength in each pair. Alternatively, each set may contain four waveguides to operate with the light of four different wavelengths, e.g., red, green, blue, and yellow.

The invention claimed is:

1. A frontlight unit for enhancing illumination of a reflective display having pixels arranged in a matrix pattern, comprising:
   an optically transparent waveguide medium having an external surface on the side opposite the reflective display;
   cores embedded in the optically transparent waveguide medium, the optically transparent waveguide medium functioning as a cladding for the cores;
   a net of planar ridge waveguides formed by cores and cladding;
   at least one source of laser light optically coupled with aforementioned net of planar ridge waveguides for delivery of laser light to the optically transparent waveguide medium, the net comprising light-separating means for separating laser light into individual light beams propagating in the planar ridge waveguides of the net and light-distributing means for receiving individual light beams and for distributing individual light beams to predetermined places of the net;
   the first individual light beam-redirection means formed on one of the core surfaces located in the aforementioned, predetermined places of the net for redirecting individual light beams that propagate through the light-distributing means in the first direction relative to the planar ridge waveguide medium and in the second direction relative to the planar ridge waveguide medium; and
   second light beam-redirection means formed on other core surfaces for redirecting individual light beams that propagate through the light-distributing means in the first direction relative to the planar ridge waveguide medium and in the second direction relative to the planar ridge waveguide medium;
   the second individual light beam-redirection means of each core being identical to the first individual light beam-redirection means of the same core but formed in positions at which light beams directed from the first individual light beam and from the second individual light beam in the first direction are doubled and in the second direction are extinguished, the first direction being the direction toward the reflective display and the second direction being the direction opposite the first direction.

2. The frontlight unit of claim 1, wherein the optically transparent waveguide medium further comprises an optically transparent substrate located on the side of the optically transparent waveguide medium that is opposite the external surface, the first direction being the direction opposite the external surface and the second direction being the direction opposite the external side.

3. The frontlight unit of claim 2, wherein the light-separation means comprise light-separating holograms, the first individual light beam-redirection means comprising the first illuminating digital planar holograms and the second individual light beam-redirection means comprising the second illuminating digital planar holograms, each core having a predetermined thickness, and the first and second individual light beam-redirection means being arranged on each core in positions at which the first and second individual light beam-redirection means interact with each other with a predetermined phase shift that doubles the light emitted in the first direction and extinguishes the light emitted in the second direction.

4. A frontlight unit for enhancing illumination of a reflective display having pixels arranged in a matrix pattern, comprising:
   an optically transparent waveguide medium having an external surface on the side opposite the reflective display,
   cores embedded in the optically transparent waveguide medium, the cores comprising a net of planar ridge waveguides comprising a plurality of light-distributing planar ridge waveguides that extend in a direction perpendicular to the light-separating waveguide in the plane of cores and that are optically coupled with the light-separating planar ridge waveguide at predetermined areas of the latter;
   at least three laser sources generating different wavelengths for delivery of light to the light-separating planar ridge waveguide;

light-separating holograms formed in the light-separating planar ridge waveguide in said predetermined areas of the light-separating planar ridge waveguide for reorienting the light obtained from at least three laser sources to the light-distributing planar ridge waveguides; and first illuminating digital planar holograms formed in the light-distributing planar ridge waveguides that emit light beams obtained from the light-separating planar ridge waveguide in the direction of the external surface of the optically transparent waveguide medium and in the direction of the reflective display with which the frontlight unit interacts, said first and second illuminating digital planar holograms being arranged in a matrix pattern that coincides with the matrix pattern of the reflective display when the frontlight unit is interposed onto the reflective display.

5. The frontlight unit of claim 4, wherein at least three laser sources generating different wavelengths comprise red, green, and blue lasers, respectively.

6. The frontlight unit of claim 5, wherein the optically transparent waveguide medium comprises an optically transparent substrate part and a cladding part formed on the optically transparent substrate part, the core being embedded into the cladding part and the cladding part having an outer surface that forms said external surface of the optically transparent waveguide medium.

7. The frontlight unit of claim 5, wherein the optically transparent waveguide medium comprises an optically transparent substrate part and a cladding part formed on the optically transparent substrate part, the core being embedded into the cladding part and the cladding part having an outer surface that forms said external surface of the optically transparent waveguide medium.

8. The frontlight unit of claim 5, wherein each core has a predetermined thickness, and the neighboring first and second illuminating digital planar holograms of each core are combined into pairs and are arranged on each core in positions at which the lights emitted from the first and second illuminating digital planar holograms of each pair interact with a predetermined phase shift that doubles the intensity of light directed to the reflective display and extinguishes the light directed to the external surface.

9. The frontlight unit of claim 4, wherein the first illuminating digital planar holograms comprise holograms of at least three types, wherein a hologram of each type interacts with the light of a wavelength different from the wavelengths specified for the holograms of other types.

10. The frontlight unit of claim 9, wherein the light-distributing planar ridge waveguides are combined into triplets for propagating lights of at least red, green, and blue colors.

11. The frontlight unit of claim 10, wherein the light-distributing planar ridge waveguides that interact with the lights of red, green, and blue colors are combined into the light-distributing planar ridge waveguide sets.

12. The frontlight unit of claim 11, wherein the light-distributing planar ridge waveguide sets are uniformly distributed in the optically transparent waveguide medium.

13. The frontlight unit of claim 12, wherein the second illuminating digital planar holograms are located on the cores at specified areas.

14. The frontlight unit of claim 13, wherein the following conditions exist for each wavelength:

$$(d-\delta)/\lambda = n_i \quad (1)$$

$$(d+\delta)/\lambda = n'_i + \tfrac{1}{2} \quad (5)$$

where formula (1) is a condition for constructive interference that doubles the intensity of light emitted to the reflective display, where formula (5) is a condition for destructive interference that eliminates light directed to the external surface, where "d" is the thickness of the waveguide core through which light propagates with wavelength λ, where δ is the distance between centers of the neighboring first and second illuminating digital planar holograms of the pair, and where $n_i$ and $n'_i$ are integers.

15. The frontlight unit of claim 10, wherein the second illuminating digital planar holograms are located on the cores at specified areas.

16. The frontlight unit of claim 4, wherein the second illuminating digital planar holograms are located on the cores at specified areas.

17. The frontlight unit of claim 4, wherein each core has a predetermined thickness, and the neighboring first and second illuminating digital planar holograms of each core are combined into pairs and are arranged on each core in positions at which the lights emitted from the first and second illuminating digital planar holograms of each pair interact with a predetermined phase shift that doubles the intensity of light directed to the reflective display and extinguishes the light directed to the external surface.

18. The frontlight unit of claim 4, wherein all cores have the same thickness "d", the neighboring first and second illuminating digital planar holograms of each core are combined into pairs, their centers are spaced at a distance δ and are arranged on each core in positions at which the first and second illuminating digital planar holograms of each pair interact with a predetermined phase shift that doubles the intensity of light directed to the reflective display and extinguishes the light directed to the external surface, where the following conditions exist for each wavelength:

$$(d-\delta)/\lambda = n_i \quad (1)$$

$$(d+\delta)/\lambda = n'_i + \tfrac{1}{2} \quad (5)$$

where formula (1) is a condition for constructive interference that doubles the intensity of light emitted to the reflective display, where formula (5) is a condition of destructive interference that eliminates light directed to the external surface, where "d" is the thickness of the waveguide core through which light propagates with wavelength λ, where δ is the distance between centers of the neighboring first and second illuminating digital planar holograms of the pair, and where $n_i$ is an integer.

19. The frontlight unit of claim 18, wherein at least three laser sources generating different wavelengths comprise red, green, and blue lasers, respectively, and wherein the light beam-redirection means installed on the external surface of the optically transparent waveguide medium comprise reflective mirrors.

* * * * *